United States Patent
Lenard

(10) Patent No.: US 12,283,814 B2
(45) Date of Patent: Apr. 22, 2025

(54) CIRCUIT MANAGEMENT SYSTEM

(71) Applicant: Sea Dragon Energy, Inc., San Diego, CA (US)

(72) Inventor: Roger Xavier Lenard, Edgewood, NM (US)

(73) Assignee: Sea Dragon Energy, Inc., San Diego, CA (US)

( * ) Notice: Subject to any disclaimer, the term of this patent is extended or adjusted under 35 U.S.C. 154(b) by 424 days.

(21) Appl. No.: 17/557,259

(22) Filed: Dec. 21, 2021

(65) Prior Publication Data

US 2023/0198297 A1 Jun. 22, 2023

(51) Int. Cl.
*H02J 13/00* (2006.01)
*H02J 3/00* (2006.01)
*H02J 3/14* (2006.01)
*H02J 3/38* (2006.01)

(52) U.S. Cl.
CPC .......... *H02J 13/0004* (2020.01); *H02J 3/003* (2020.01); *H02J 3/14* (2013.01); *H02J 3/381* (2013.01); *H02J 2300/22* (2020.01)

(58) Field of Classification Search
CPC .......... H02J 13/0004; H02J 3/003; H02J 3/14; H02J 3/381; H02J 2300/22; H02J 7/35; H02J 13/00002; H02J 13/00004; H02J 13/00026; H02J 2300/24; H02J 2310/12
See application file for complete search history.

(56) References Cited

U.S. PATENT DOCUMENTS

| | | | | |
|---|---|---|---|---|
| 9,831,664 | B1 * | 11/2017 | Sastry | H02H 7/26 |
| 9,871,407 | B2 * | 1/2018 | Nielsen | F03D 7/0264 |
| 10,892,618 | B1 * | 1/2021 | Cooper | H02J 9/00 |
| 2014/0088780 | A1 * | 3/2014 | Chen | H02J 13/00004 |
| | | | | 700/295 |
| 2021/0083506 | A1 * | 3/2021 | Rao | H02J 3/14 |
| 2021/0337480 | A1 * | 10/2021 | Shedletsky | H04M 1/724 |
| 2022/0137100 | A1 * | 5/2022 | Barbut | G01R 15/202 |
| | | | | 324/251 |

OTHER PUBLICATIONS

Tan Kock Li, Kenny Chieng Tze Hing, Chai Chin Tin, Alvey Hau Lee Cheun, Tan Rong Wei, & Chuah Yea Dat. (2012). Development of an automated multiple power sources switching and Monitoring System. 2012 IEEE Conference on Sustainable Utilization and Development in Engineering and Technology (Year: 2012).*

* cited by examiner

*Primary Examiner* — Thomas C Lee
*Assistant Examiner* — Tyler Dean Hedrick
(74) *Attorney, Agent, or Firm* — BAKERHOSTETLER

(57) ABSTRACT

A method for managing electrical loads includes monitoring current of the branch circuits to determine an electricity demand of the branch circuits. The method includes comparing an available supply with the electricity demand. Each of the branch circuits are connected to the available supply by a circuit breaker that requires manual reset (e.g., if tripped) connected in series with a controllable relay. The method includes controlling the controllable relays to connect and disconnect the branch circuits from the available supply.

20 Claims, 3 Drawing Sheets

CIRCUIT MANAGEMENT SYSTEM

TECHNICAL FIELD

This application relates generally to circuit management systems and methods and, more particularly, to smart distribution of limited power within a building in response to disconnection from, loss of, or restricted power from the grid.

BACKGROUND

Use of alternative electricity sources-including solar panel and uninterruptible power supplies-to power buildings (e.g., residences), either as a primary power source or as a backup power source to supplement grid power, such as during a grid outage, presents complex technological (e.g., power prioritization) problems. Existing solutions are cost prohibitive and may require expensive battery backup power or wholesale replacement of existing electrical distribution systems. Conventional solutions may also provide limited functionality. For example, they cannot selectively switch to a secondary power source. As another example, they cannot selectively, remotely both disconnect and reconnect certain branch circuits within a building in response to changes in power supply and demand due to safety restrictions or priority demands.

There is a need in the art for a circuit management system that can provide such flexible solutions.

SUMMARY

In one aspect, this disclosure is directed to an electrical system that may include multiple energy sources (e.g., two) each configured to generate a power output. In some aspects, the energy sources may include a renewable power source (e.g., roof mounted solar panels) or other energy back-up resources (e.g., a standby generator) and a utility power source In some aspects, the power sources (e.g., excepting a utility feed under normal conditions) may not be able to supply the reference need of the building simultaneously. Moreover, there may be instances where a grid is similarly restricted. For example, restrictions or penalties may be imposed by a utility to curb energy use and/or incentives may limit energy use in a demand-response program. Under such conditions, an ability to purposefully limit specific loads to an available grid limit or other restricted power source while selecting circuits within one or more restrictions may still allow use of all building electrical demands. The system may also include a distribution system to transmit the power output from the energy sources to a plurality of branch circuits (e.g., including a first branch circuit and a second branch circuit). Each branch circuit may include a circuit breaker having a circuit breaker output to deliver power to a branch load. The circuit breaker of each branch circuit may require a manual reset upon tripping. Each branch circuit may also include a circuit management system (CMS) serially connecting the circuit breaker output to the branch load. The CMS may consist of one or several CMS controller modules and one or several CMS relay modules. Each CMS relay module may include a current sensor to measure a current of the branch circuit. Each CMS relay module may also include a relay (e.g., solid-state relay or electromechanical relay) arranged to connect and disconnect the branch load from the circuit breaker in response to a control signal received by the CMS relay module. The distribution system may also include a CMS controller module, communicatively coupled to each of the CMS relay modules. The distribution system may also include memory storing instructions that cause the CMS controller module to effectuate operations autonomously. The operations may include receiving sensor signals from the current sensors of the plurality of CMS relay modules indicative of the current on their respective branch circuits. The operations may include determining a demand based on the sensor signals and determining a power capacity of a renewable power source or a standard emergency source (e.g., a standby generator). The operations may also include comparing the demand and the power capacity and generating the control signal based at least on the comparison. The operations may also include transmitting the control signal to the plurality of branch circuits. The control signal may cause the CMS relay modules to control their respective relays (e.g., solid-state relays or electromechanical relays) to disconnect the first branch circuit and to connect the second branch circuit. The operations may include an initial sensing of the circuit prior to energizing the circuit to ascertain whether or not the circuit is safe and operable to energize.

In another aspect, this disclosure is directed to a circuit management system (CMS) relay module for a branch circuit. The CMS relay module may include a first connection for directly coupling to a circuit breaker to receive and measure power and a second connection for serially connecting the circuit breaker to a load of the branch circuit. The CMS relay module may also include an electrically controllable relay serially connected between the first connection and the second connection and arranged to connect and disconnect the load. In some aspects, the CMS relay module does not interfere with, modify, or diminish circuit protection capabilities of an installed circuit breaker. The CMS relay module may include a current sensor to measure a current of the branch circuit and a transceiver to communicate with a CMS controller module. The CMS relay module may also include a processor communicatively coupled to the transceiver and memory storing instructions that cause the processor to effectuate operations. The operations may include receiving a sensor signal indicative of the current from the current sensor and transmitting the sensor signal to the CMS controller module. The operations may also include receiving a control signal from the CMS controller module and, responsive to the control signal, causing the electrically controllable relay to close, thereby enabling the load to receive at least a portion of the power.

In yet another aspect, this disclosure is directed to a method of managing power. The method may include sensing a plurality of currents. Each of the plurality of currents may correspond to a respective branch circuit of a plurality of branch circuits. The method may include determining an electricity demand of the plurality of branch circuits based at least on the plurality of currents. The method may also include comparing an available energy supply with the electricity demand. The method may also include determining that a first branch circuit of the plurality of branch circuits has a lower priority than a second, (or higher order) branch circuit of the plurality of branch circuits. The method may also include transmitting a control signal to cause the controllable relay of the first branch circuit to open, thereby disconnecting the first branch circuit from the available supply.

DETAILED DESCRIPTION

A circuit management system (CMS) is disclosed. The CMS may be used to control the electricity for a house. For example, the CMS may switch power from a primary source (e.g., the grid) to a secondary power source (e.g., solar power systems, uninterruptible power supplies, or standby generators) in response to a trigger. For example, the CMS May switch to secondary power during periods of time in which the utility rates for grid power are higher than normal. As another example, the CMS may switch to secondary power in response to detecting the loss or instability of the primary power source (e.g., a grid fault).

In some cases, whether the house is powered by the grid or secondary power supply, it may be advantageous to disconnect certain branch circuits to save energy. For example, when a secondary power source has a finite amount of power, the CMS may disconnect branch circuits not in use (e.g., to prevent an inverter or generator overload). The CMS may also provide functionality to remotely switch which branch circuits are connected or disconnected from such power. In an example, a branch circuit for the HVAC system may be disconnected to enable a clothes dryer to finish a load of laundry. Once the dryer cycle is complete, the CMS may disconnect the branch circuit for the dryer, once again freeing up enough electricity to reconnect and resume use of the HVAC system.

Figure 1:
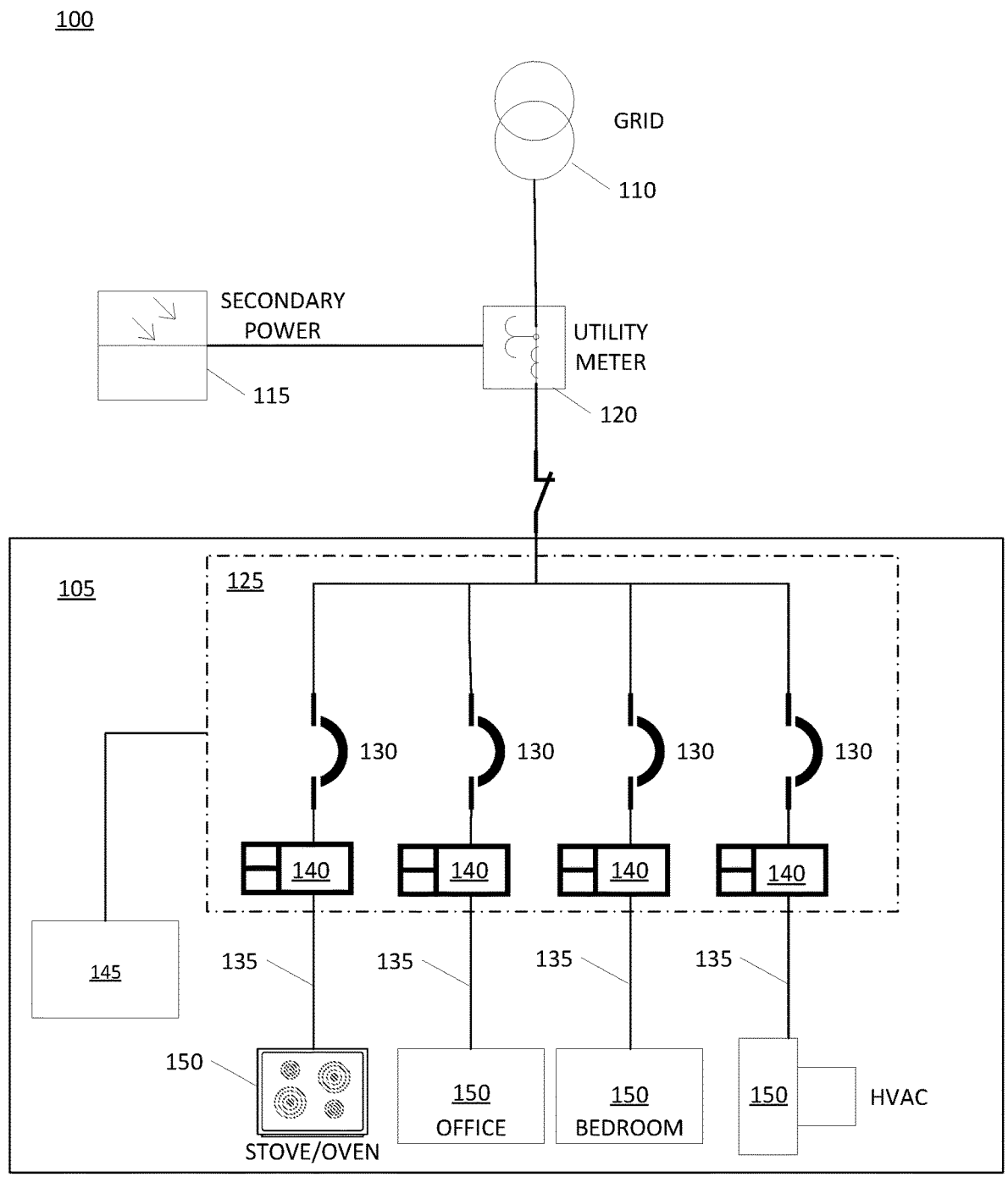
FIG. 1 is a single line drawing illustrating an exemplary electrical system for a residence including a circuit management system.

FIG. 1 illustrates an exemplary electrical system 100 for a building, such as a house 105. Electrical system 100 may include a primary power source, such as a connection to grid 110. Electrical system 100 may include a secondary power source 115. For example, FIG. 1 includes a solar power system. In another example, secondary power source 115 may include one or more of solar power systems, uninterruptible power supplies (e.g., batteries), wind power or any other power source. Both power sources may comprise any type(s) of power supplies, including photovoltaic supplies, uninterruptible power supplies, wind power supplies, hydro-power supplies, internal combustion power supplies, or any other electric generator power supply. Secondary power source 115 may be connected to utility meter 120 and may be able to provide power to the grid 110 in addition to the house 105.

House 105 may include a distribution system 125 to deliver power from the power sources 110, 115 to the various loads in the house. Distribution system 125 may include a circuit breaker panel, a distribution board, or the like. Distribution system 125 may include one or more circuit breakers 130. Each circuit breaker 130 may connect to a branch circuit 135. Circuit breakers 130 may respond to fault conditions on branch circuit 135 to disconnect the affected branch circuit 135, interrupting electrical flow to the affected branch circuit 135. Circuit breaker panels may include multiple circuit breakers 130 to protect multiple branch circuits 135. In the closed position, circuit breaker 130 connects its respective branch circuit 135 to power. When circuit breaker 130 is tripped, it opens the circuit connecting power to its branch circuit 135. The CMS may include circuit sensing functionality to determine if the circuit is properly functional prior to energizing the circuit breaker to prevent a future fault condition.

Circuit breaker 130 may be an automatically operated electrical switch designed to protect branch circuit 135 from damage caused by excess current from an overload or short circuit. Each circuit breaker 130 may have a current rating commensurate with the demands on its respective branch 135. Common ratings for residential circuit breakers (e.g., for single line loads) are between 15 and 20 Amps. When the current exceeds a limit based on the circuit breaker's rating, circuit breaker 130 will trip. Such trips may indicate a problem on branch circuit 135. If the circuit breaker 130 trips repeatedly after being reset, this may suggest a more serious problem that requires inspection and repair. Therefore, once tripped, circuit breakers 130 it is not advisable to automatically reset breakers 130 multiple times. Furthermore, it is desirable to confirm that no imminent danger (of damage or injury) is present before circuit breaker 130 is reset. It is preferrable to have a circuit breaker 130 that requires a manual and on-site reset once it trips, as opposed to functionality to remotely or electronically reset the breaker to mitigate the risk of improper resetting. In this manner, circuit breaker 130 acts as a fail-safe against damage to or caused by distribution system 125.

In some cases, it may be advantageous to disconnect certain branch circuits 135 even when the conditions are not serious enough to warrant tripping circuit breaker 130. For example, it may be desirable to preemptively disconnect branch circuit 135 when abnormal conditions are detected in system 100 to stop a more dangerous condition that would trip circuit breaker 130. As another example, it may be desirable to disconnect a branch circuit 135 to conserve energy.

To provide this functionality, system 100 includes a CMS relay module 140 connected in series between circuit breaker 130 and its respective branch 135. CMS relay control module 140 may communicate with a CMS controller module 145 that monitors and electronically controls CMS relay module 140. As discussed in the above example, when it is desirable, CMS relay module 140 may disconnect a load 150, such as an unoccupied bedroom, to conserve power to be used for more critical loads 150, such as the HVAC. In this manner, the CMS, including CMS relay modules 140 and CMS controller module 145, may complement circuit breakers 130 to control power distribution in house 105 (e.g., without compromising the circuit protective function of the circuit breaker).

Figure 2:
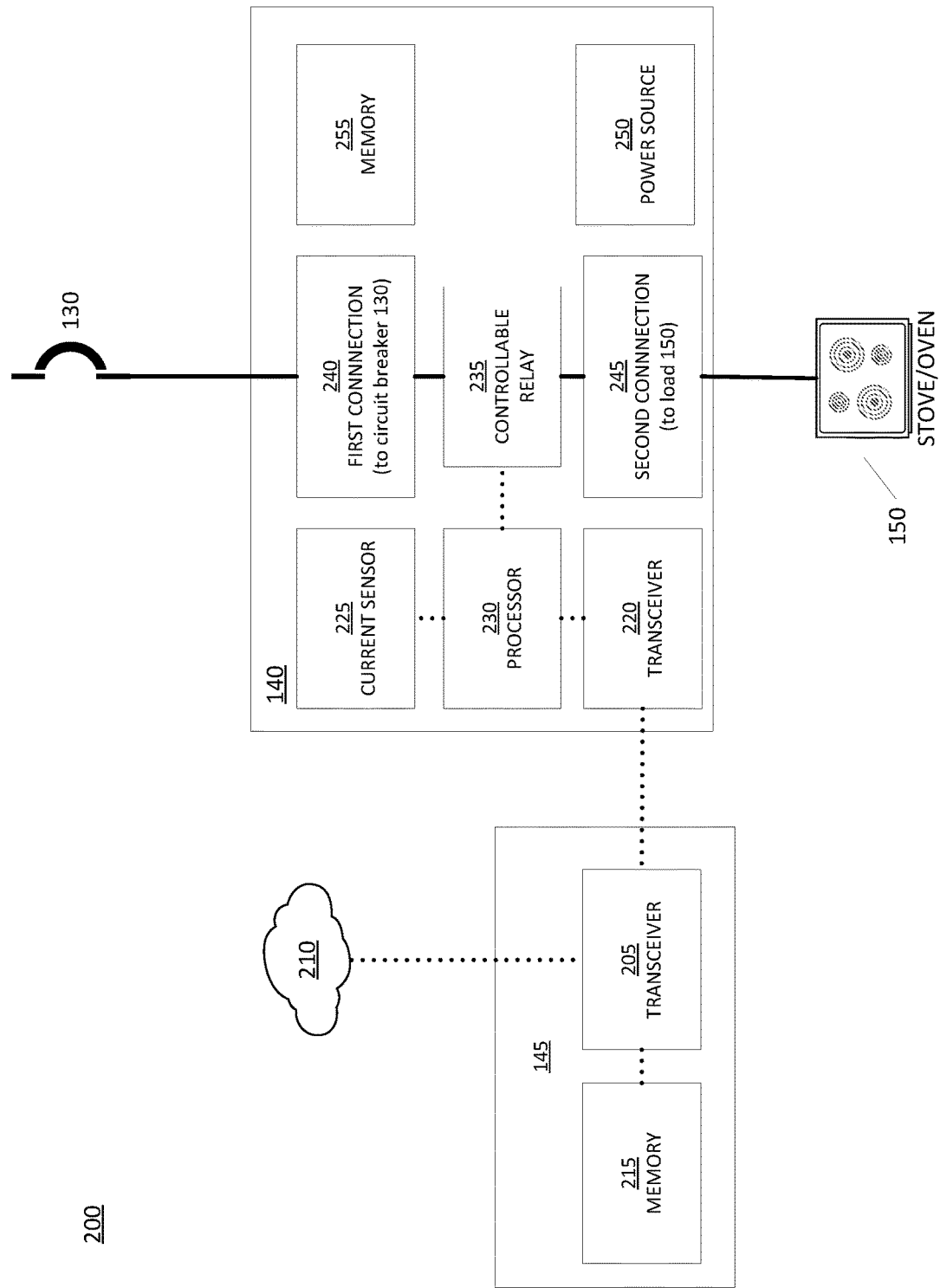
FIG. 2 is a single line drawing illustrating an exemplary circuit management system.

FIG. 2 is a block diagram of an exemplary CMS 200. CMS 200 may include CMS controller module 145 that communicates with each of the CMS relay modules 140 using a transceiver 205 of the CMS controller module 145. Additionally, CMS controller module 145 may receive communications regarding the status or operating conductions of grid power 110 and secondary power 115. For example, CMS controller module 145 may detect when grid power 110 is lost or when secondary power 115 is being used. CMS controller module 145 may determine an available power amount. For example, in instances when power is being supplied to distribution system 125 through secondary power 115, CMS controller module 145 may determine how much power is available compared to the current demand on power by distribution system 125. This could include historical modeling of power output (e.g., for solar power) to estimate how much power will be generated, or it could be calculating the available battery life of an uninterruptible power supply.

Additionally, CMS controller module 145 may communicate with other devices via a network 210. For example, CMS controller module 145 may communicate with an application through which a user configures and sends instructions to CMS controller module 145. For example, a user may designate the priorities of the branch circuits 135. In this way, when power is limited, CMS controller module 145 may cause lower priority branch circuits 135 to disconnect (or remain disconnected) and cause higher priority branch circuits to connect (or remain connected). These operations may be executed using instructions stored on memory 215, which may be collocated with CMS controller module 145 or accessed through network 210.

CMS controller module 145 may be communicatively coupled to one or more of the CMS relay modules 140. For example, CMS controller modules 145 may communicate using its transceiver 205 connected to transceiver 220 of CMS relay module 140. Such communication may occur wirelessly, such as over a Wi-Fi network, via Bluetooth, or through any other type of wired or wireless communication method. For example, CMS controller module 145 may connect to CMS relay modules 140 through a mesh network. Transceiver 205 and transceiver 220 may include one or more Bluetooth antennas.

CMS relay module 140 may be configured to monitor and control its respective branch circuit 135. CMS 200 may function to monitor electrical characteristics of the electrical distribution system, including the availability of power supplies and the electrical loads 150 represented by each circuit 135. For example, CMS relay module 140 may include one or more sensors, such as current sensor 225 to monitor the status of branch circuit 135. For example, current sensor 225 may include a Hall current sensor. Current sensor 225 may transmit signals indicative of a current of branch circuit 135 to CMS controller module 145. Such signals may be processed by a processor 230 of CMS relay module 140 prior to being transmitted by transceiver 220. CMS relay module 140 may include other sensors that monitor other electrical characteristics, such as voltage, resistance, power characteristics. CMS relay module 140 may react to the status or historical changes of the electrical characteristics associated with its respective branch circuit 135. For example, if the characteristics indicate that only a small amount of power is being drawn by the load 150, this may indicate that the room associated with load 150 is not being used. To conserve power, processor 230 may cause controllable relay 235 to open, disconnecting that load 150. This may be advantageous when the power supply is limited, such as during a grid outage. The triggers and schedule by which CMS relay modules 140 connect and disconnect their loads 150 from power may be configured at CMS controller module 145, by user input through network 210, stored in local memory 255, or the like.

CMS relay module 140 includes a controllable relay 235 connected in series between circuit breaker 130 and load 150. Controllable relay 235 may be a solid-state relay, electromechanical relay, or any other type of relay that is able to be opened and closed in response to a command signal. As shown in FIG. 2, CMS relay module 140 may include a first connection 240 by which controllable relay 235 is serially connected to circuit breaker 130 and a second connection 245 by which controllable relay 235 is serially connected to load 150. Controllable relay 235 may include the functionality to be remotely closed and remotely opened. This enables CMS relay modules 140 to control which branch circuits 135 are connected and disconnected remotely, such as through CMS controller module 145, as long as the respective circuit breaker 130 of that branch circuit 135 is closed. By contrast, circuit breaker 130 may require a local reset if circuit breaker 130 is tripped.

In response to user input or the monitored electrical characteristics, CMS relay module 140 may be controlled to disconnect or connect a circuit branch 135 from the power supplies 110 and 115. To enable this functionality, processor 230 may receive power from a power source 250 of CMS relay module 140. This power source 250 may receive power indirectly from power supplies 110 and 115. Power source 250 may include additional backup power, such a battery source, to ensure CMS relay module 140 can operate during a loss of power (e.g., restricted power) from one or more supplies 110 and 115.

Figure 3:
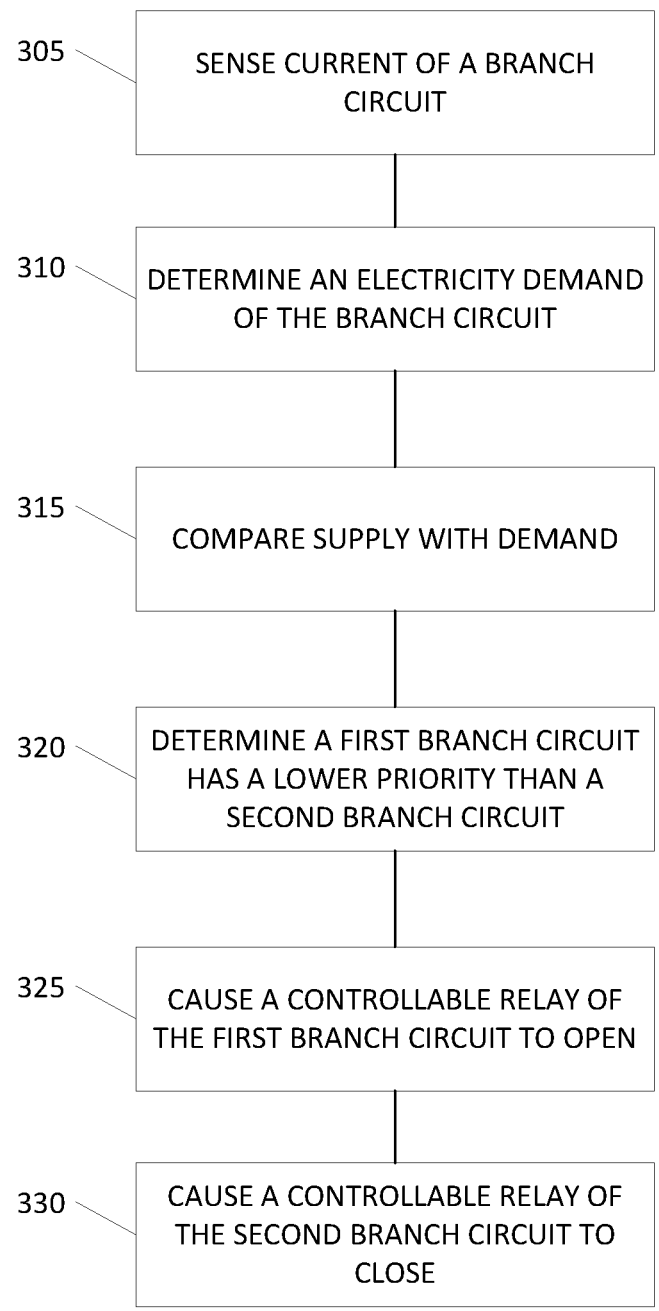
FIG. 3 is a flowchart illustrating a method of managing power.

FIG. 3 shows a flowchart of a method 300 for managing electrical loads. This method may be performed at least in part by CMS controller module 145. At step 305, method 300 may include sensing a plurality of currents. Each of the plurality of currents may correspond to a respective one of a plurality of branch circuits 135. For example, CMS controller module 145 may receive signals based on currents sensed by current sensors 225 of each CMS relay control module 140.

At step 310, method 300 may include determining an electricity demand of the plurality of branch circuits 135 based at least one the plurality of currents. For example, this may include detecting which branch circuits 135 are currently drawing power. This may include comparing current electrical characteristics with historical information regarding the same branch circuits 135. For example, step 310 may include determining that a branch circuit 135 is not in active use as its power demands are lower than normal. Step 310 may include determining a total electricity demand.

As step 315, method 300 may include comparing the available power supply with the demand. This may include calculating how much time the available power can continue to keep up with demand, particularly when a finite power source (e.g., battery) is being used. For power supplies that are lower than the power demand, this may include determining how much demand must be decreased. For example, if solar power supply 115 is only outputting 70% of the power currently used by distribution system 125, this may include determining how many (or which) branches circuits 135 to disconnect based on their current power demand. This may also include communicating to a user the amount of time after which the secondary power supply 115 will run out based on projected usage. In response, user can send a signal to CMS controller module 145 to turn open one or more controllable relays 235 of CMS modules 140.

At step 320, method 300 may include determining that a first branch circuit 135 has a lower priority than second branch circuit 135. This may be based on a user-designated priority, such as that set by a schedule. For example, the branch circuit 135 for certain appliances (e.g., oven) may have lower priority during night hours, when it is unlikely those appliances need power. This may be based on the sensed currents associated with the first and second branch circuits 135. For example, this may be based on the second branch circuit 135 powering a washer/dryer that is in the middle of a cycle. This may be based on a static characteristic of branch circuits 135. For example, branch circuit 135 may have a higher priority because it powers a refrigerator, while a branch circuit 135 that powers a less important appliance (e.g., a television) may have a lower priority. This may be based on another characteristic of branch circuit 135. For example, first branch circuit 135 may have lower priority because its controllable relay 235 is already open.

At step 325, method 300 may include causing controllable relay 235 to open. For example, CMS controller module 145 may send a command to CMS relay control module 140 that causes controllable relay 235 of first branch circuit 135 to open. As another example, processor 230 of CMS relay module 140 may send a signal to open controllable relay 235. At step 330, method 300 may include causing controllable relay 235 to close. For example, CMS controller module 145 may send a command to CMS relay module 140 that causes controllable relay 235 of second branch circuit 135 to close. As another example, processor 230 of CMS relay module 140 may send a signal to close controllable relay 235. In this manner, if circuit breaker 130 is closed, then closing controllable relay 235 completes the circuit for that branch circuit 135. CMS controller module 145 may control CMS relay module 140 in response to a user command.

The disclosed circuit management system (CMS) may be part of an integrated electrical distribution system that includes circuit breakers. In some cases, the CMS may be retrofitted into a preexisting circuit breaker panel, for example utilizing existing circuit breakers. For example, CMS relay module 140 may be contained in a package configured to attach to circuit breaker 130. These options provide multiple advantages over the prior art. For example, the CMS may be incorporated into existing buildings without the need of replacing the existing electrical distribution system. As another example, the CMS may rely on the safety mechanisms already provided by circuit breakers 130; instead of replacing these safety mechanisms, CMS can supplement the existing safety mechanisms with additional controls that may be overridden by the circuit breaker in response to a fault.

What is claimed:

1. An electrical system comprising:
   a plurality of circuit management system (CMS) relay modules, each of the plurality of CMS relay modules serially connecting a circuit breaker within a circuit breaker panel to a branch load for each of a plurality of branch circuits, each of the CMS relay modules comprising:
   a current sensor to measure a current of one of the plurality of branch circuits, and
   a relay arranged to energize and deenergize the branch load from the circuit breaker in response to a control signal received by the CMS relay module; and
   a CMS controller module communicatively coupled to each of the plurality of CMS relay modules through a wireless network, wherein each of the plurality of CMS relay modules is within the circuit breaker panel and individually controlled remotely by the CMS controller module through the wireless network, wherein the CMS controller module comprises memory storing instructions that cause the CMS controller module to effectuate operations, the operations comprising:
   receiving sensor signals from current sensors indicative of the current on a respective one of the plurality of branch circuits;
   determining which of the plurality of branch circuits are in active use by comparing changes in electrical characteristics of the sensor signals with historical changes of electrical characteristics associated with the plurality of branch circuits;
   determining a demand of branch circuits in the plurality of branch circuits in active use;
   determining a power capacity of a renewable power source;
   generating the control signal based at least in part on a comparison between the demand and the power capacity; and
   transmitting the control signal to at least two of the plurality of CMS relay modules through the wireless network, wherein the control signal causes a first CMS relay module to control a first relay to energize a first branch circuit of the plurality of branch circuits to a first circuit breaker and further causes a second CMS relay module to control a second relay to deenergize a second branch circuit of the plurality of branch circuits from a second circuit breaker.

2. The electrical system of claim 1, wherein the operations further comprise:
   receiving a user input indicative of a request to energize the first branch circuit;
   generating a second control signal based on the user input; and
   transmitting the second control signal to at least the first branch circuit, wherein the second control signal causes the first relay of the first branch circuit to close.

3. The electrical system of claim 1, wherein the current sensor comprises a Hall current sensor.

4. The electrical system of claim 1 further comprising a mesh network communicatively coupling the CMS controller module to the CMS relay modules.

5. The electrical system of claim 1, wherein the operations further comprise determining a status of the second branch circuit and wherein the generating the control signal is further based on the status of the second branch circuit.

6. The electrical system of claim 1, wherein disconnecting the first branch circuit is based at least in part on the first branch circuit having a lower priority than the second branch circuit.

7. The electrical system of claim 1, wherein the operations further comprise generating a second control signal based on a change in the sensor signals.

8. A circuit management system (CMS) relay module for a branch circuit, the CMS relay module comprising:
   a first connection for directly coupling to a circuit breaker within a circuit breaker panel to receive power;
   a second connection for serially connecting the circuit breaker to a load of the branch circuit;
   an electrically controllable relay serially connected between the first connection and the second connection and arranged to connect and disconnect the load;
   a current sensor to measure a current of the branch circuit;
   a transceiver to communicate with a CMS controller module through a wireless network, wherein the CMS relay module is within the circuit breaker panel and controlled remotely by the CMS controller module through the wireless network;
   a processor communicatively coupled to the transceiver; and
   a memory, storing instructions that cause the processor to effectuate operations, the operations comprising:
   receiving a sensor signal indicative of the current from the current sensor;
   transmitting the sensor signal to the CMS controller module;
   receiving a control signal from the CMS controller module based at least in part on a comparison between a demand of branch circuits in a plurality of branch circuits in active use and a power capacity of a source of the power, the demand being based on a determination of which of the plurality of branch circuits are in active use at least in part by a comparison between electrical characteristics of the sensor signal and historical information associated with the branch circuit; and responsive to the control signal, causing the electrically controllable relay to close to cause the load to receive at least a portion of the power.

9. The CMS relay module of claim 8, wherein the control signal is based on a user input.

10. The CMS relay module of claim 8, wherein the electrically controllable relay comprises a solid-state relay, electromechanical relay or any other type of relay that is able to be opened and closed in response to a command signal.

11. The CMS relay module of claim 8, further comprising a power source for powering the processor.

12. The CMS relay module of claim 8, further comprising a package containing at least the current sensor and the memory, the package configured to attach to the circuit breaker within the circuit breaker panel.

13. The CMS relay module of claim 12, wherein the package further contains the circuit breaker.

14. The CMS relay module of claim 8, wherein the transceiver includes a Bluetooth antenna.

15. A method for managing electrical loads, the method comprising:
- sensing a plurality of currents, each of the plurality of currents corresponding to a respective branch circuit of a plurality of branch circuits;
- determining which of the plurality of branch circuits are in active use based at least on a comparison between electrical characteristics of the plurality of currents and historical information associated with the plurality of branch circuits;
- determining an electricity demand of branch circuits in the plurality of branch circuits in active use;
- comparing an available supply with the electricity demand;
- determining that a first branch circuit of the plurality of branch circuits has a lower priority than a second branch circuit of the plurality of branch circuits; and
- transmitting a control signal to cause a controllable relay of the first branch circuit to open and disconnect the first branch circuit from the available supply, wherein each controllable relay of a respective branch circuit of the plurality of branch circuits is within a circuit breaker panel and individually controlled remotely through a wireless network.

16. The method of claim 15, wherein the control signal further causes a controllable relay of the second branch circuit to close and connect the second branch circuit to the available supply.

17. The method of claim 15, further comprising determining the available supply by detecting that a first power source has been lost and measuring a supply of a second power source.

18. The method of claim 17, further comprising:
- detecting that the first power source has recovered; and
- sending a second control signal to close the controllable relay of the first branch circuit.

19. The method of claim 18, further comprising calculating a time period after which the supply of the second power source will be depleted by the electricity demand.

20. The method of claim 19, further comprising:
- communicating, to an end user, the time period; and
- receiving, from the end user, a command responsive to the time period,
- wherein determining that the first branch circuit as the lower priority is based at least on the command.

* * * * *